United States Patent
Sueyoshi et al.

(10) Patent No.: US 10,239,355 B2
(45) Date of Patent: Mar. 26, 2019

(54) PNEUMATIC TIRE

(71) Applicant: SUMITOMO RUBBER INDUSTRIES LTD., Kobe-shi, Hyogo (JP)

(72) Inventors: Mitsuru Sueyoshi, Kobe (JP); Akihiro Tamugi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 826 days.

(21) Appl. No.: 14/720,291

(22) Filed: May 22, 2015

(65) Prior Publication Data
US 2015/0336430 A1 Nov. 26, 2015

(30) Foreign Application Priority Data

May 26, 2014 (JP) .................................. 2014-108375
Jan. 9, 2015 (JP) .................................. 2015-002724

(51) Int. Cl.
*B60C 11/13* (2006.01)
*B60C 11/03* (2006.01)
(Continued)

(52) U.S. Cl.
CPC ........... *B60C 11/0316* (2013.01); *B60C 11/11* (2013.01); *B60C 11/1307* (2013.01);
(Continued)

(58) Field of Classification Search
CPC ............. B60C 11/0316; B60C 11/1307; B60C 11/1392; B60C 2011/133; B60C 2011/1245; B60C 11/1376; B60C 11/1384
(Continued)

(56) References Cited

U.S. PATENT DOCUMENTS 4,693,290 A * 9/1987 Curtiss .................... B60C 11/11
152/450
D337,978 S * 8/1993 Himuro ........................ D12/579
(Continued)

FOREIGN PATENT DOCUMENTS

EP 0393873 A2 * 10/1990 ......... B60C 11/0309
JP 62157812 A * 7/1987
(Continued)

OTHER PUBLICATIONS

Machine Translation: JP06143939A; Hayakawa, Toshio; (Year: 2017).*

(Continued)

*Primary Examiner* — Kendra Ly
(74) *Attorney, Agent, or Firm* — Birch, Stewart, Kolasch & Birch LLP

(57) ABSTRACT

A pneumatic tire includes a tread portion provided with a pair of central blocks arranged on both sides of a tire equator. Each of the central blocks includes a ground contacting face having an axially inner block edge facing the tire equator. The inner block edge extends in a V-shaped manner including a first inclined edge and a second inclined edge inclined in an opposite direction to the first inclined edge. The second inclined edge has a circumferential length shorter than a circumferential length of the first inclined edge. Each of the central blocks includes a first portion having the first inclined edge and a second portion having the second inclined edge. The second portion of the central block includes an end wall at an opposite side to the first portion. The end wall includes a stepwise wall extending in steps toward a groove bottom.

17 Claims, 12 Drawing Sheets

(51) Int. Cl.
*B60C 11/11* (2006.01)
*B60C 11/12* (2006.01)
(52) U.S. Cl.
CPC ....... *B60C 11/1236* (2013.01); *B60C 11/1323* (2013.01); *B60C 2200/14* (2013.01)
(58) Field of Classification Search
USPC .................................................. 152/DIG. 3
See application file for complete search history.

(56) References Cited

U.S. PATENT DOCUMENTS

| | | | | |
|---|---|---|---|---|
| 6,530,405 | B1 * | 3/2003 | Brown .................... | B60C 11/01 152/209.16 |
| D627,709 | S * | 11/2010 | Harvey ...................... | D12/579 |
| 2001/0032691 | A1 * | 10/2001 | Ohsawa .................. | B60C 11/13 152/209.18 |
| 2007/0102085 | A1 * | 5/2007 | Ohashi ................. | B60C 11/0309 152/209.18 |
| 2007/0240801 | A1 * | 10/2007 | Tanaka ................. | B60C 11/0302 152/209.21 |
| 2008/0041509 | A1 * | 2/2008 | Shimizu ................ | B60C 11/0311 152/209.16 |
| 2009/0145529 | A1 * | 6/2009 | Miyazaki ............. | B60C 11/0309 152/209.21 |
| 2010/0000643 | A1 * | 1/2010 | Minoli .................... | B60C 11/13 152/209.15 |
| 2013/0139936 | A1 * | 6/2013 | Ohara .................... | B60C 13/02 152/209.11 |
| 2015/0290977 | A1 * | 10/2015 | Yamamoto .............. | B60C 11/12 152/209.18 |
| 2016/0121659 | A1 * | 5/2016 | Kageyama .......... | B60C 11/1384 152/209.24 |
| 2017/0057295 | A1 * | 3/2017 | Kageyama .............. | B60C 11/11 |

FOREIGN PATENT DOCUMENTS

| | | | |
|---|---|---|---|
| JP | 01095910 A | * | 4/1989 |
| JP | 06143939 A | * | 5/1994 |
| JP | 9-300915 A | | 11/1997 |
| JP | 11157308 A | * | 6/1999 |
| JP | 2006341769 A | * | 12/2006 |
| JP | 2008037219 A | * | 2/2008 ......... B60C 11/0306 |
| JP | 2013216118 A | * | 10/2013 |

OTHER PUBLICATIONS

Machine Translation: JP-2006341769-A; Takahashi, Shingo; (Year: 2017).*
Machine Translation: JP-11157308-A; Hino, Hidehiko; (Year: 2017).*
Machine Translation: JP-2008037219-A; Ochi, Naoya (Year: 2017).*
Machine Translation: JP-2013216118-A; Matsushita Kotaro (Year: 2017).*
Machine Translation: JP01095910A; Nakamura, Hiroshi (Year: 2017).*
Machine Translation: JP-62157812-A; Takahashi, Osamu; (Year: 2018).*

* cited by examiner

PNEUMATIC TIRE

BACKGROUND OF THE INVENTION

Field of the Invention

The present invention relates to pneumatic tires, and more particularly to a pneumatic tire for off-road having excellent mud terrain performance.

Description of the Related Art

Pneumatic tires for off-road have been requested to obtain excellent mud terrain performance that offers a large traction on mud terrain as well as self-cleaning ability to remove mud from tread grooves during traveling. In order to improve mud terrain performance of tires, Japanese Unexamined Patent application Publication No. H09-300915 discloses a pneumatic tire including a tread portion provided with a plurality of tread grooves to form a plurality of blocks.

Unfortunately, conventional pneumatic tires tend to be clogged with mud quickly during traveling and therefore may not maintain excellent mud performance for a long time.

SUMMARY OF THE INVENTION

Problems to be Solved by the Invention

The present invention has been worked in light of the circumstances described above, and it is a main object thereof to provide a pneumatic tire having improved mud terrain performance which may last for a long time based on improvement of central block structure.

Means of Solving the Problems

In accordance with the present invention, there is provided a pneumatic tire including a tread portion provided with a pair of central blocks arranged on both sides of a tire equator. Each of the central blocks includes a ground contacting face having an axially inner block edge facing the tire equator. The inner block edge extends in a V-shaped manner including an axially innermost point, a first inclined edge extending from the innermost point, and a second inclined edge extending from the innermost point and inclined in an opposite direction to the first inclined edge, wherein the second inclined edge has a circumferential length shorter than a circumferential length of the first inclined edge. Each of the central blocks includes a first portion having the first inclined edge and a second portion having the second inclined edge. The second portion of the central block includes an end wall at an opposite side to the first portion. The end wall includes a stepwise wall that extends in steps toward a groove bottom.

In another aspect of the invention, the stepwise wall, in a cross-section, may includes a step face having an angle in a range of not more than 15 degrees with respect to the ground contacting face of the central block.

In another aspect of the invention, the stepwise wall may include an axially inner stepwise wall portion and an axially outer stepwise wall portion, and the end wall may further comprise a slope face provided between the inner stepwise wall portion and the outer stepwise wall portion.

In another aspect of the invention, each of the inner stepwise wall portion and the outer stepwise wall portion may comprise a plurality of the step faces, and a number of step faces of the inner stepwise wall portion may be greater than a number of step faces of the outer stepwise wall portion.

In another aspect of the invention, each of the central blocks may be provided with at least one sipe extending in a longitudinal direction of the second portion.

In another aspect of the invention, the pair of axially adjacent central blocks may be arranged so that each of the first inclined edges faces one another.

In another aspect of the invention, each of the ground contacting faces of the central blocks may comprise a fourth inclined edge extending along the end wall, and the fourth edge may be inclined in the same direction as the first inclined edge.

In another aspect of the invention, the fourth inclined edge, in a plan view of the tread portion, has an angle of not less than 15 degrees with respect to an axial direction of the tire.

In another aspect of the invention, the fourth inclined edge has a length in a range of from 20% to 50% of an axial length between the tire equator and an axially outermost point of the central block.

In another aspect of the invention, the stepwise wall, in a cross-section, further comprises a plurality of riser faces having an angle larger than that of the step face.

In another aspect of the invention, the stepwise wall, in a cross-section, may further comprise a first internal corner formed between the groove bottom and the one of the riser faces, and a second internal corner formed between the step face and the other one of the riser faces. The first internal corner may be chamfered in an arc manner having a first radius of curvature and the second internal corner may be chamfered in an arc manner having a second radius of curvature. The first radius of curvature may be greater than the second radius of curvature.

In another aspect of the invention, the stepwise wall may comprise an axially inner stepwise wall portion having a plurality of the step faces, an axially outer stepwise wall portion having a plurality of the step faces, and a central stepwise wall portion provided between the inner stepwise wall portion and the outer stepwise wall portion, wherein the central stepwise wall portion has one step face.

In another aspect of the invention, each of the inner stepwise wall portion and the outer stepwise wall portion may comprise a lowest step face arranged in the same height of the step face of the central stepwise wall portion.

In another aspect of the invention, the step face of the central stepwise wall portion, in a cross-section, may have a horizontal length in a range of not less than 15% of a length of the second inclined length.

In another aspect of the invention, each of the inner stepwise wall portion and the outer stepwise wall portion may comprise a first step face and a second step face, the first step face has a height from the groove bottom in a range of from 30% to 38% of a maximum central block height, and the second step face has a height from the groove bottom in a range of from 64% to 72% of the maximum central block height.

In another aspect of the invention, the tread portion has a central region having an axial width that is equal to a width between axially outer ends of the pair of central blocks, and the central region may have a land ratio in a range of from 50% to 60%.

DESCRIPTION OF THE EMBODIMENTS

An embodiment of the present invention will be explained below with reference to the accompanying drawings. It should be noted that like elements are denoted by the same numeral reference throughout the disclosure.

First Embodiment

Figure 1:
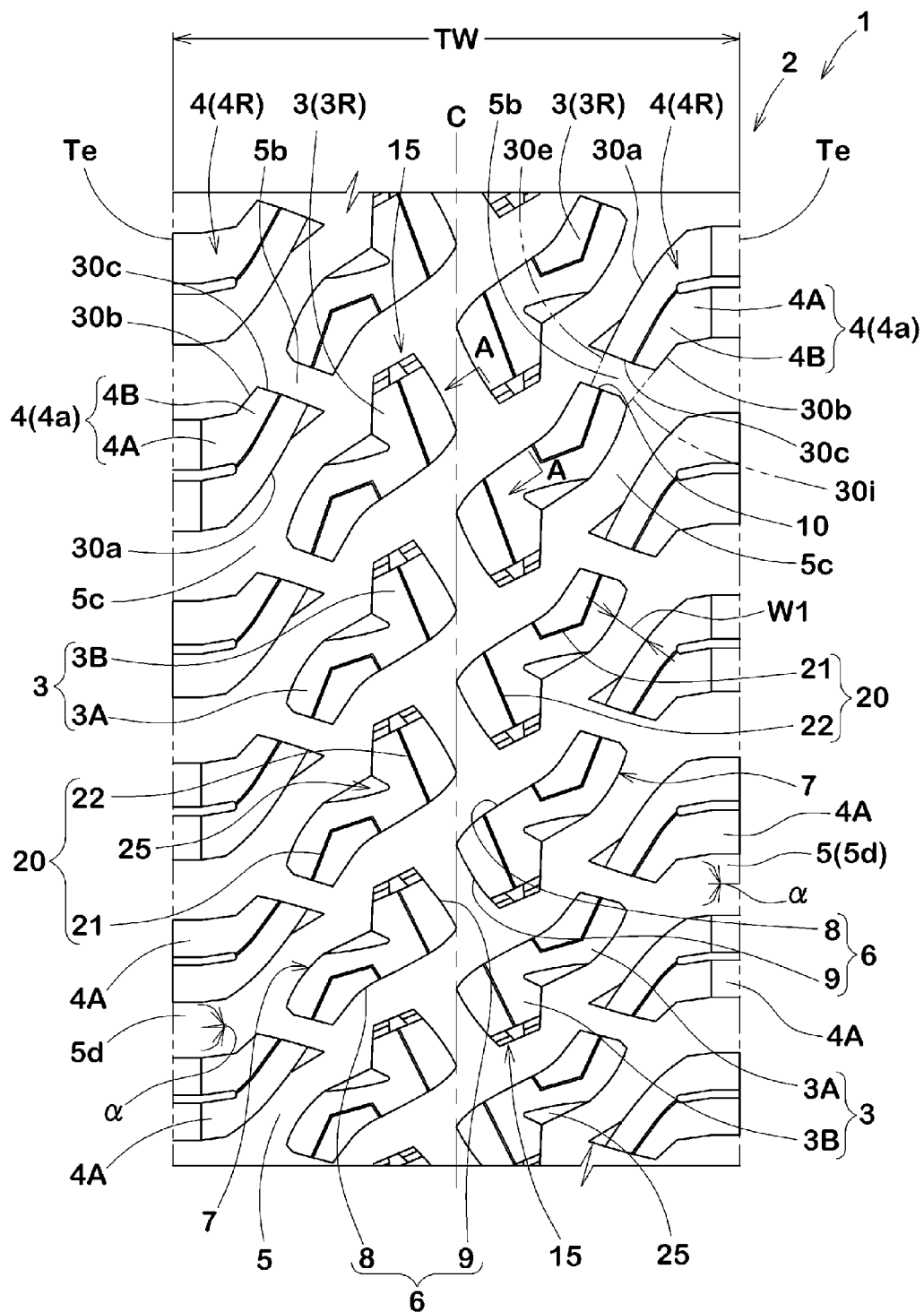
FIG. 1 is a development view of a tread portion of a pneumatic tire in accordance with a first embodiment of the present invention.

FIG. 1 illustrates a development view of a tread portion 2 of a pneumatic tire 1 in accordance with the first embodiment of the present invention. The pneumatic tire 1 in accordance with the present embodiment, for example, is preferably embodied as an all season tire for four-wheel drive vehicle.

As shown in FIG. 1, the tread portion 2 is provided with a pair of central block rows 3R arranged on both sides of the tire equator C, and a pair of shoulder block rows 4R each arranged proximately to each tread edge Te on both sides of the tire equator C. Each of the central block rows 3R includes a plurality of central blocks 3 arranged in a circumferential direction of the tire. Each of the shoulder block rows 4R includes a plurality of shoulder blocks 4 arranged in the circumferential direction of the tire. The tread portion 2 further includes a groove 5 to define the respective central blocks 3 and shoulder blocks 4.

The tread pattern according to the present embodiment is substantially configured as a point symmetrical design with respect to a point on the tire equator C. The tread pattern may be applied a variable pitch arrangement for blocks which would offer a non-perfect point symmetrical design The tread edges Te refer to axially outermost edges of the ground contacting patch of the tread portion 2 which occurs under a normally inflated loaded condition when the camber angle of the tire is zero. The normally inflated loaded condition is such that the tire 1 is mounted on a standard wheel rim with a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in T&RA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in T&RA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in T&RA or the like.

In case of passenger car tires, however, the standard pressure and standard tire load are uniformly defined by 180 kPa and 88% of the maximum tire load, respectively.

In this application including specification and claims, various dimensions, positions and the like of the tire refer to those under a normally inflated unloaded condition of the tire unless otherwise noted. The normally inflated unloaded condition is such that the tire 1 is mounted on the standard wheel rim with the standard pressure but loaded with no tire load. The tread width TW is the width measured under the normally inflated unloaded condition, as the axial distance between the tread edges Te and Te.

Figure 2:
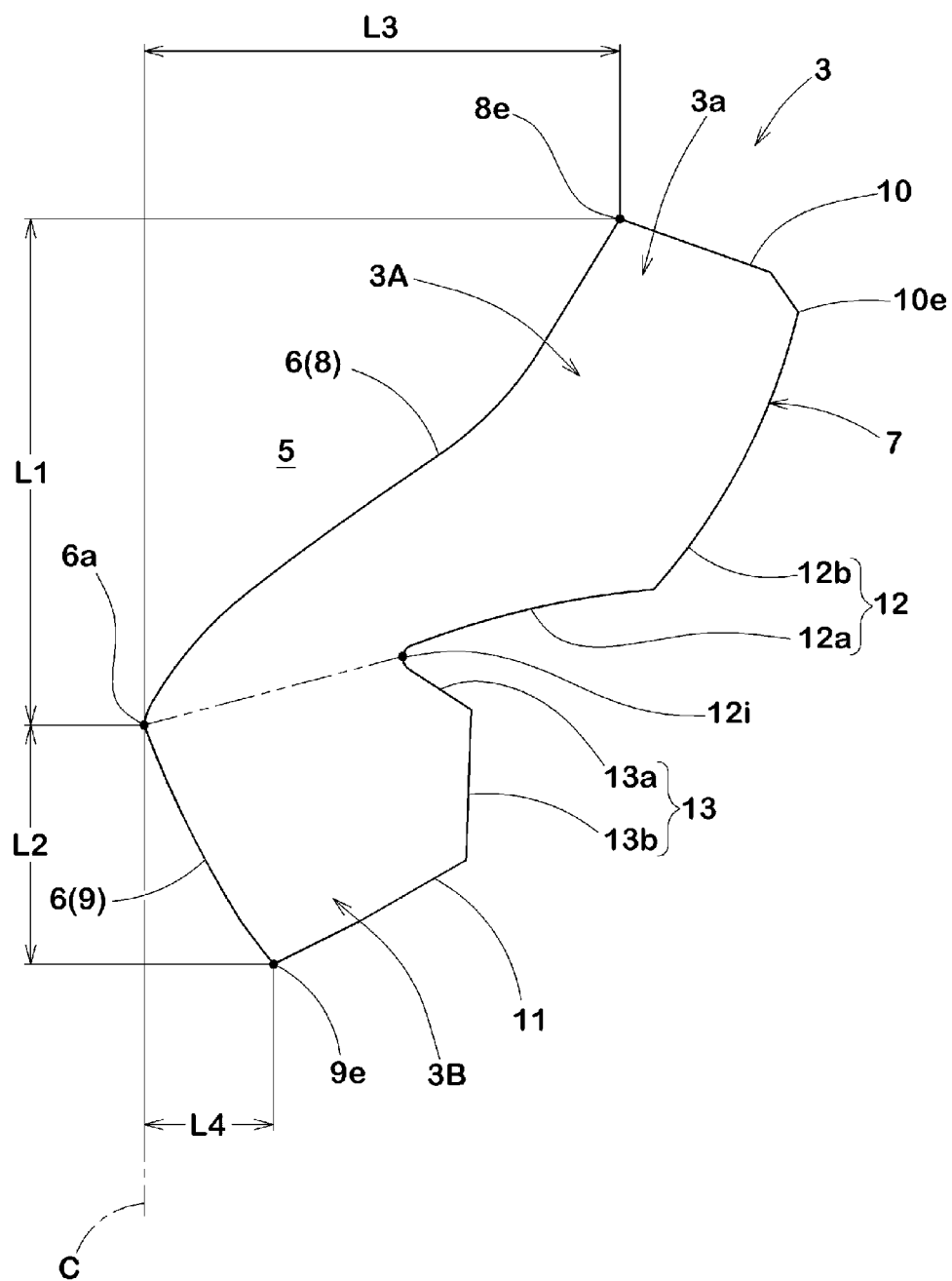
FIG. 2 is an enlarged view of a ground contacting face of a central block of FIG. 1.

FIG. 2 illustrates an enlarged view of a ground contacting face 3a of the right side central block 3 of FIG. 1. As shown in FIG. 2, the ground contacting face 3a of the central blocks 3 includes an inner block edge 6 facing the tire equator C, and an outer block edge 7 facing the tread edge Te.

The inner block edge 6 extends in a V-shaped manner that includes an axially innermost point 6a, a first inclined edge 8 extending from the innermost point 6a, and a second inclined edge 9 extending from the innermost point 6a and inclined in an opposite direction to the first inclined edge 8. Each of the first inclined edge 8 and the second inclined edge 9 includes an axial component that may generate traction force during traveling on mud terrain by shearing mud.

The outer block edge 7 includes a third edge 10 extending axially outwardly from the axially outer end 8e of the first inclined edge 8 with an inclination in opposite direction to the first inclined edge 8, a fourth edge 11 extending axially outwardly from the axially outer end 9e of the second inclined edge 9 with an inclination in opposite direction to the second inclined edge 9, a fifth edge 12 extending axially inwardly from the axially outer end 10e of the third edge 10 with the same inclination direction as the first inclined edge 8, and a sixth edge 13 extending between the axially inner end 12i of the fifth edge 12 and the fourth edge 11. In this embodiment, the fifth edge 12 and the sixth edge 13 are connected so as to form a substantially V-shape manner protruding toward the tire equator C.

The fifth edge 12 includes a fifth gentle slope portion 12a, and a fifth steep slope portion 12b having an angle with respect to the axial direction of the tire greater than that of the fifth gentle slope portion 12a. The fifth steep slope portion 12b is connected to the axially outer end 10e of the third edge 10.

The sixth edge 13 includes a sixth gentle slope portion 13a, and a sixth steep slope portion 13b having an angle with respect to the axial direction of the tire greater than that of the sixth gentle slope portion 13a. The sixth gentle slope portion 13a is connected to the axially inner end 12i of the fifth edge 12.

The central block 3 comprises a first portion 3A having the first inclined edge 8 and a second portion 3B having the second inclined edge 9. The first portion 3A of the central block 3 is surrounded by the first inclined edge 8, the third edge 10 and the fifth edge 12. The second portion 3B is surrounded by second inclined edge 9, the fourth edge 11 and the sixth edge 13. The ground contacting face 3a of the central block 3 is configured to a V-shaped manner by connecting the first portion 3A and the second portion 3B.

The central block 3 may effectively trap mud in a void of the groove 5 between the first portion 3A and the second portion 3B during traveling on mud terrain to promote traction for the tread portion 2.

The second inclined edge 9 is configured to have a circumferential length L2 shorter than a circumferential length L1 of the first inclined edge 8. This structure provides for rigidity difference between the first portion 3A and the second portion 3B so that uneven deformation occurs on the central block 3 when coming into contact with the road. Such uneven deformation of the central block 3 may eject mud from the void between the first portion 3A and the second portion 3B and therefore provides for improved self-cleaning ability to remove mud from grooves 5 during traveling. In order to further improve the above advantageous effect, the second inclined edge 9 preferably has an axial length L4 in a range of from 15% to 35% of an axial length L3 of the first inclined edge 8.

When the length L2 of the second inclined edge 9 is excessively small relative to the length L1 of the first inclined edge 8, the deformation of the first portion 3A tends to be excessively large, and results in less traction. Preferably, the length L2 of the second inclined edge 9 is in a range of from 40% to 60% of the length L1 of the first inclined edge 8.

Figure 3:
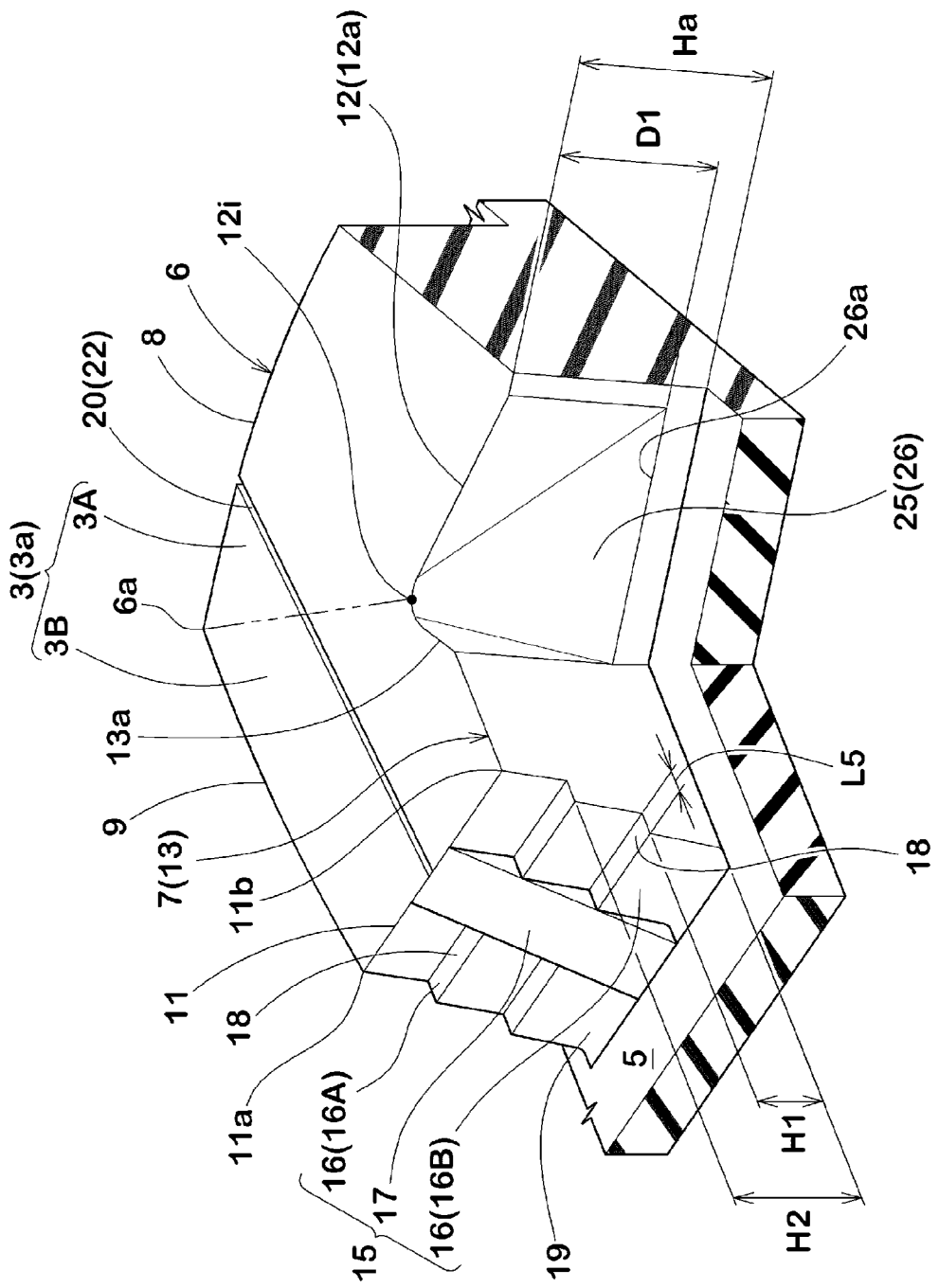
FIG. 3 is a partial perspective view of the central block.
Figure 4:
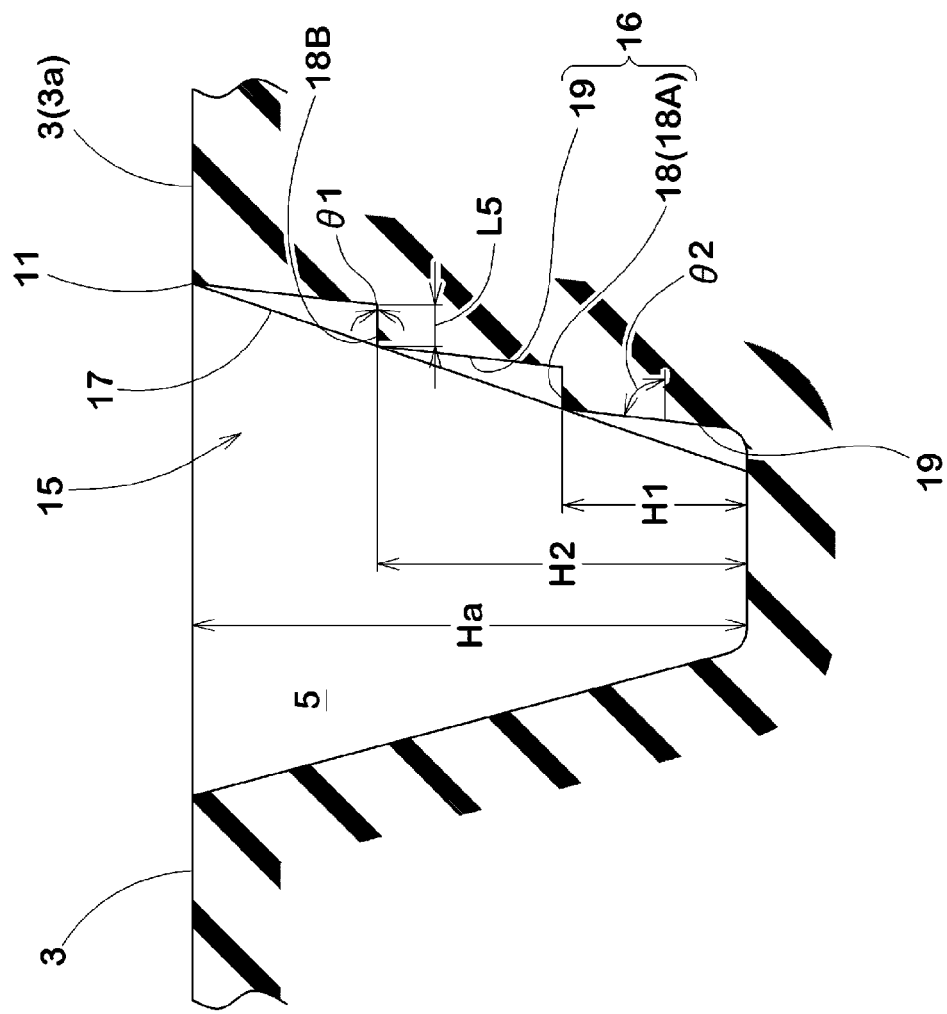
FIG. 4 is a cross-sectional view taken along lines A-A of FIG. 1.

FIG. 3 illustrates a partial perspective view of a portion around the second portion 3B of the central block 3, and FIG. 4 illustrates a cross-sectional view taken along lines A-A of FIG. 1. As shown in FIGS. 3 and 4, the second portion 3B includes an end wall 15, which extends radially inwardly from the fourth edge 11, at an opposite side to the first portion 3A.

The end wall 15 according to the present embodiment includes a stepwise wall 16 that extends in steps toward a bottom of the groove 5 and a slope face 17 that extends from the ground contacting face 3a to the bottom of the groove 5. Such an end wall 15 enables to crack clogging mud in the groove 5 adjacent to the end wall 15 using the wall corners, and then the clogging mud in the groove 5 may be broken and released from the groove 5 due to growing the crack on the mud. Furthermore, although the amount of deformation of the second portion 3B is less than that of the first portion 3A when the central block 3 comes into contact with the road, the clogging mud in the groove 5 can be effectively released by providing the stepwise wall 16 on the second portion 3B.

The stepwise wall 16 includes an axially inner stepwise wall portion 16A arranged on the side of the tire equator C, and an axially outer stepwise wall portion 16B arranged axially outwardly of the inner stepwise wall portion 16A. In this embodiment, the inner stepwise wall portion 16A includes the axially inner end 11a of the fourth edge 11 and the outer stepwise wall portion 16B includes the axially outer end 11b of the fourth edge 11. This structure may effectively crack clogging mud in the groove, thereby further improving self-cleaning ability to remove mud from grooves during traveling. Furthermore, cracks on mud provided by the inner and outer stepwise wall portions 16A and 16B tend to grow in direction along the second inclined edge 9 or the sixth edge 13 and therefore the self-cleaning ability of the tread portion may further be improved.

As shown in FIG. 4, the stepwise wall 16, in a cross-section, includes a step face 18 having an angle $\theta 1$ in a range of not more than 15 degrees with respect to the ground contacting face 3a of the central block 3, and a plurality of riser faces 19 each having an angle $\theta 2$ with respect to the ground contacting face 3a larger than the angle $\theta 1$ of the step face 18. In this embodiment, each of the inner and outer stepwise wall portions 16A and 16B includes a first step face 18A arranged on the side of the bottom of the groove 5 and a second step face 18B arranged radially outward of the first step face 18A to further improve the self-cleaning ability of the tread portion 2.

In order to further improve the advantageous effect, the second step face 18B preferably has a height H2 from the bottom of the groove 5 in a range of from 64% to 72% of the maximum central block height Ha. Similarly, the first step face 18A preferably has a height H1 from the bottom of the groove 5 in a range of from 30% to 38% of the maximum central block height Ha.

In order to further promote traction while giving cracks to clogging mud in the groove 5, the respective step faces 18, in a cross-section, preferably have a horizontal length L5 in a range of from 10% to 30% of the maximum central block height Ha As shown in FIG. 3, the number of step faces 18 included in the inner stepwise wall portion 16A is configured to the same as the number of step faces 18 included in the outer stepwise wall portion 16B. This structure may offer a well balanced rigidity on the end wall 15 so as to crack clogging mud in the groove 5 effectively.

The slope face 17 extends smoothly from the ground contacting face 3a to the bottom of the groove 5. The slope face 17 enables to increase rigidity of the end wall 15 so as to promote traction for the tread portion 2.

The slope face 17 according to the present embodiment is provided between the inner stepwise wall portion 16A and the outer stepwise wall portion 16B. This structure may enhance the rigidity of the end wall 15 in a well balanced manner and can be prevented a large deformation of the second portion 3B of the central block 3 when coming into contact with the road.

Figure 5:
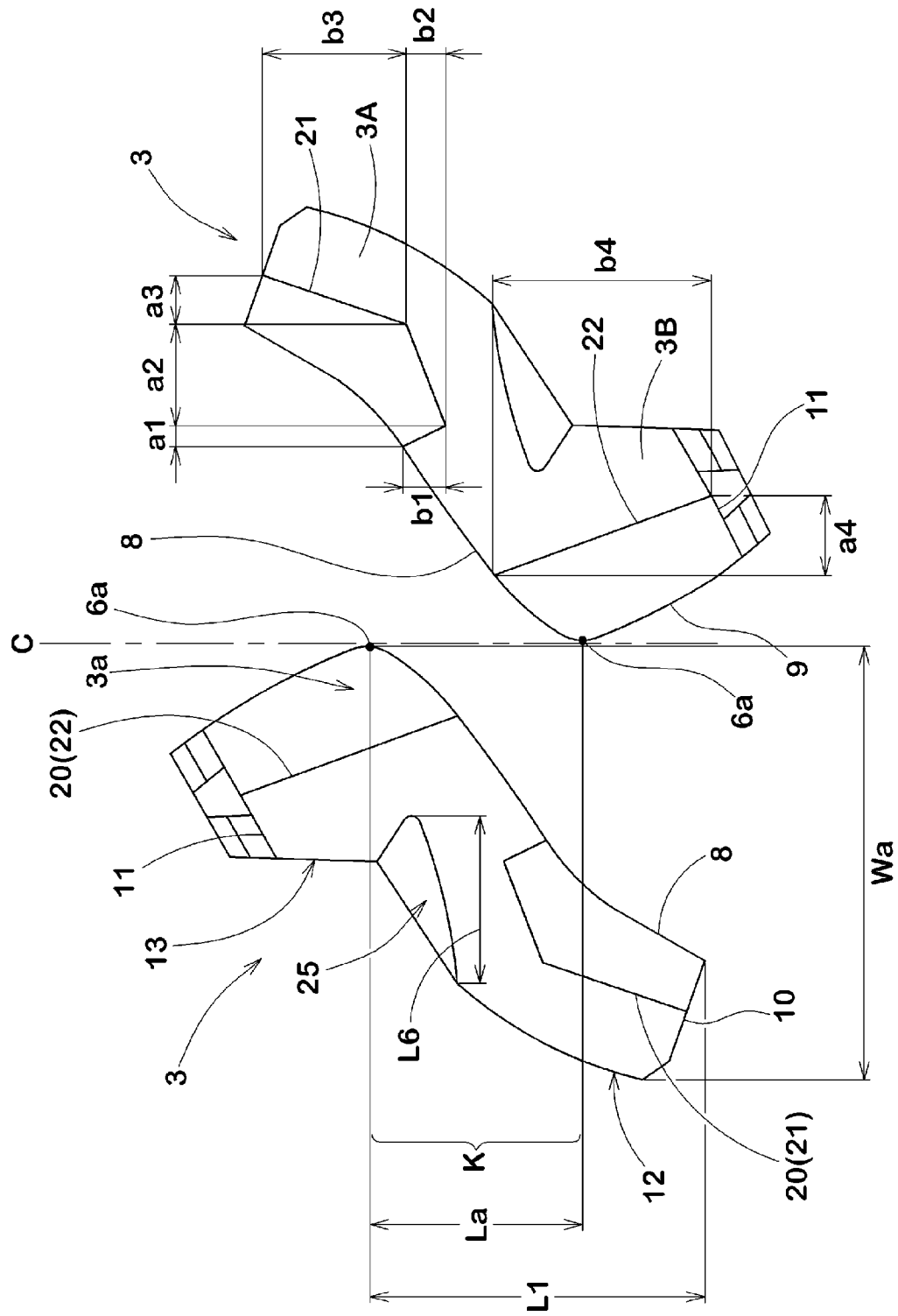
FIG. 5 is an enlarged view of a pair of central blocks of FIG. 1.

FIG. 5 illustrates an enlarged view of an axially adjacent pair of central blocks 3 arranged on both sides of the tire equator C. As shown in FIG. 5, each of the central blocks 3 is provided with at least one sipe 20. The at least one sipe 20 enables to soften the central block 3 to promote the deformation of the first portion 3A and the second portion 3B during grounding so that mud is introduced into the void between the first portion 3A and the second portion 3B and then is pushed out therefrom.

In this embodiment, the at least one sipe 20 includes an axially outer sipe 21 arranged axially outwardly of the central block 3, and an axially inner sipe 22 arranged axially inwardly of the outer sipe 21. These sipes 20 and 21 may help to soften the rigidity of the central block 3 in a well balanced manner to promote the deformation of the central block 3 described above.

The outer sipe 21 and the inner sipe 22 are arranged without communicating one another, and preferably are arranged without overlapping in both of axial and circumferential directions of the tire. These sipes 20 and 21 may further improve the advantageous effect described above.

The outer sipe 21 extends to the first inclined edge 8 from the third edge 10 while bending.

In this embodiment, the inner sipe 22 extends along the longitudinal direction of the second portion 3B from the fourth edge 11 to the first inclined edge 8, for example. The inner sipe 22 effectively softens the rigidity of the second portion 3B, which hardly deforms compared with the first portion 3A, to promote the deformation of the end wall 15 in order to crack clogging mud in the groove.

Each of the sipes 21 and 22 includes an axial component length (A) and a circumferential component length B. As shown in FIG. 5, the outer sipe 21, for example, has the axial component length a1, a2 and a3, and the circumferential component length b1, b2 and b3. Similarly, the inner sipe 22, for example, has the axial component length a4 and the circumferential component length b4. Preferably, the total circumferential component length B (=b1+b2+b3+b4) of the sipes 21 and 22 is preferably in a range of from 45% to 75% of the total of the circumferential and axial component lengths B+A (=b1+b2+b3+b4+a1+a2+a3+a4), in order to further promote the deformation of the central block 3 during traveling while ensuring rigidity of the central block 3. Preferably, the sipes 21 and 22 have a width of not more than 1.0 mm, and a depth in a range of 9.0 to 14.0 mm.

In this embodiment, the pair of central blocks 3 and 3 are arranged so that the respective first inclined edges 8 and 8 are facing one another. Thus, mud can be introduced into the groove 5 between the pair of central blocks 3 and 3 during grounding to further promote traction for the tread portion 2. In order to further improve the advantageous effects, the pair of central blocks 3 adjacent in the axial direction of the tire are arranged so that the respective first inclined edges 8 and 8 are overlapped in the circumferential direction of the tire at an overlap length La. Preferably, the overlap length La is in a range of not less than 5%, more preferably not less than 7%, but preferably not more than 20% of the tread width TW in order to promote traction on mud terrain while ensuring self-cleaning ability of the tread portion 2. Furthermore, the circumferential length L1 of the first inclined edge 8 is preferably in a range of from 10% to 30% of the tread width TW.

As shown in FIG. 3. the ground contacting face 3a of the central block 3 is provided with a recess 25 on an internal corner portion protruding toward the tire equator C between the fifth gentle slope portion 12a and the sixth gentle slope portion 13a. The recess 25 includes a gentle slope face 26 that may be useful to eject mud from the groove smoothly, thereby further improving the mud terrain performance of the tire.

The gentle slope face 26 of the recess 25 according to the present embodiment has a radially inner end 26a positioned upwardly of the bottom of the groove 5. Such a recess 25 may be useful to maintain the rigidity of the central block 3 so that excessive deformation of the first and second portions 3A and 3B is prevented. Furthermore, such a recess 25 may promote traction for the tread portion 2 on the mud terrain. The structure of the recess 25 is not particularly limited to the present embodiment.

Preferably, the recess 25 in accordance with the present embodiment has a depth (maximum depth) D1 in a range of from 50% to 80% of the maximum height Ha of the central block 3 in order to ensure the rigidity of the central block 3 while improving traction force on mud terrain.

As shown in FIG. 5, the recess 25 has an axial length L6 in a range of from 10% to 30% of the maximum axial width Wa of the central block 3 in order to further improve the advantageous effects described above.

In the same point of view, the recess 25 preferably has an area in a range of from 3% to 10% of the gross area of the ground contacting face 3a of the central block 3 in a plan view of the central block 3. Here, the gross area of the ground contacting face 3a of the central block 3 refers to an area that includes the area of the recess 25.

As shown in FIG. 1, the shoulder blocks 4 includes an outer portion 4A extending axially inward from the tread edge Te at an angle of not more than 15 degrees with respect to the axial direction of the tire and an inner portion 4B inclined at an angle with respect to the axial direction of the tire which is greater than that of the outer portion 4A. When the shoulder block 4 comes into contact with mud terrain, the shoulder block 4 may deform to promote traction so as to effectively compress mud between the outer portion 4A and the inner portion 4B.

In this embodiment, the inner portion 4B of the shoulder block 4 includes an axially inner edge 30a, an axially outer edge 30b and a middle edge 30c connecting between the inner edge 30a and the outer edge 30b. The middle edge 30c is inclined in an opposite direction to the inner edge 30a. The inner and outer edges 30a and 30b are inclined in the same direction.

The inner portion 4B of the shoulder block 4 faces the first portion 3A of the central block 3 through the groove 5b. In this embodiment, the groove 5c formed between the shoulder blocks 4 extends from one of the tread edges Te to the other one of the tread edges Te while inclining. Preferably, the groove 5d formed between outer portions 4A of the shoulder blocks 4 extends at an angle α in a range of not more than 15 degrees with respect to the axial direction.

Preferably, each of tread blocks 3 and 4 have a height in a range of from 12 to 18 mm in order to improve mud terrain performance and steering stability of the tire.

Preferably, the groove 5 has a width W1, which is measured perpendicular to a groove centerline, in a range of from 5% to 15% of the tread width TW, in order to offer sufficient void to promote traction on mud terrain as well as self-cleaning ability of the tread portion 2 while offering sufficient rigidity of the respective blocks 3 and 4.

Second Embodiment

Figure 6:
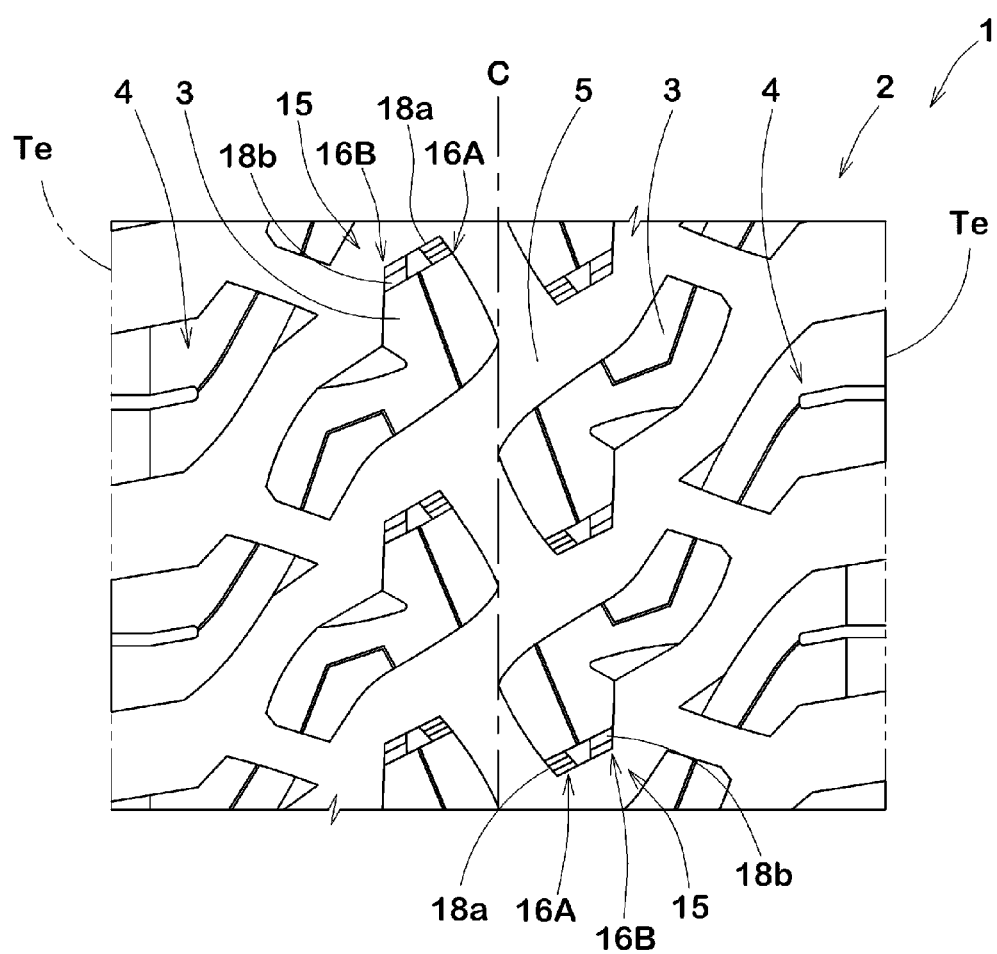
FIG. 6 is a development view of the tread portion of the pneumatic tire in accordance with a second embodiment of the present invention.

FIG. 6 illustrates a development view of the tread portion 2 in accordance with the second embodiment of the present invention. In this embodiment, the end wall 15 of the central block 3 includes the axially inner stepwise wall portion 16A and the axially outer stepwise wall portion 16B, wherein the number of step faces 18a of the inner stepwise wall portion 16A is greater than the number of step faces 18b of the outer stepwise wall portion 16B. In this embodiment, the inner stepwise wall portion 16A includes three step faces 18a, and the outer stepwise wall portion 16B includes two step faces 18b, for instance. Such an end wall structure may offer excellent self-cleaning ability to eject mud from the grooves around the tire equator C. Furthermore, since the outer stepwise wall portion 16B may have step faces 18 with a long horizontal length as compared with the inner stepwise wall portion 16A, it may provide for a large lateral force when cornering.

Third Embodiment

Figure 7:
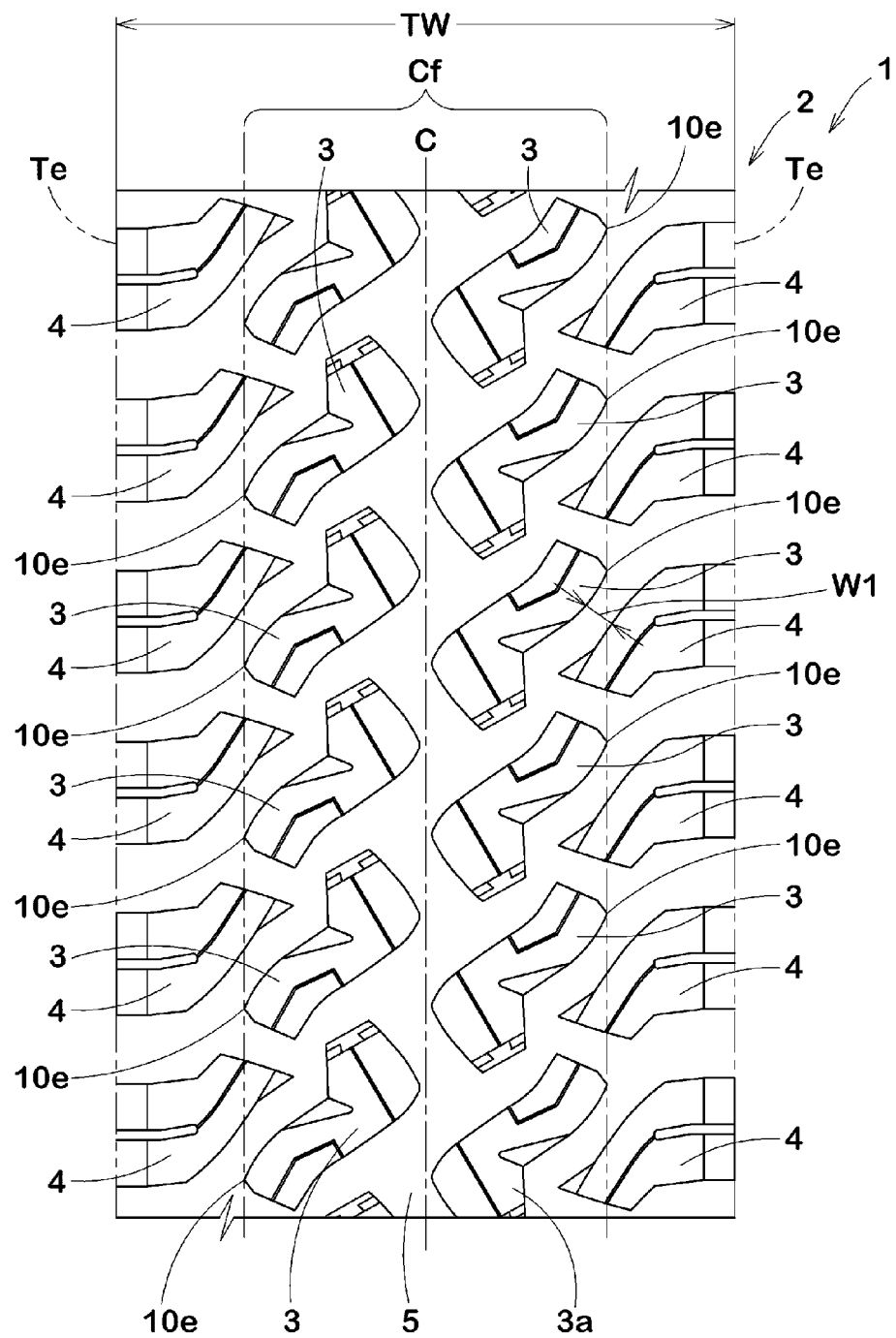
FIG. 7 is a development view of the tread portion of the pneumatic tire in accordance with a third embodiment of the present invention.
Figure 8:
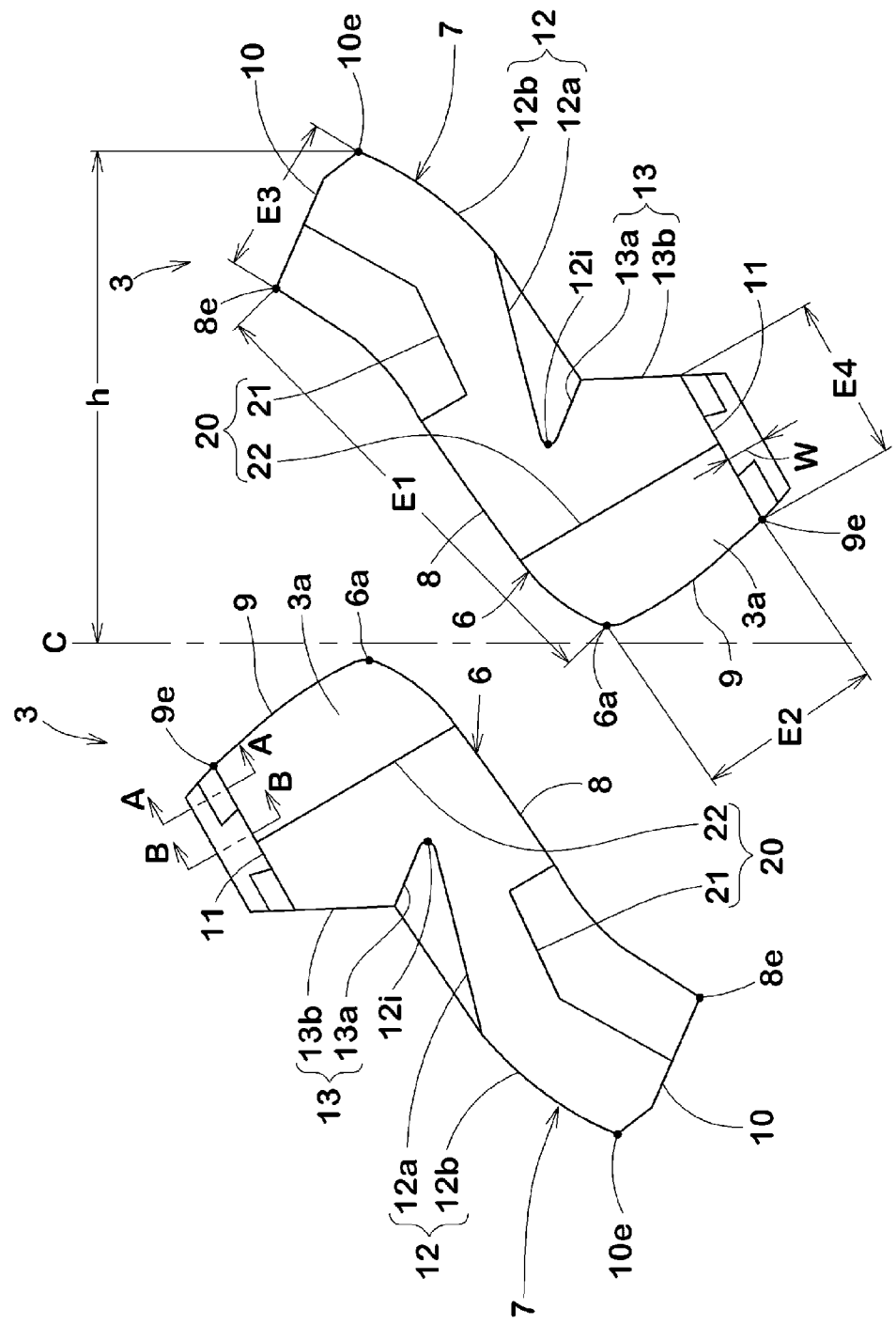
FIG. 8 is an enlarged view of a pair of central blocks of FIG. 7.

FIG. 7 illustrates a development view of the tread portion 2 in accordance with the third embodiment of the present invention, and FIG. 8 illustrates an enlarged view of a pair of central blocks of FIG. 7. In this embodiment, the fourth edge 11 extends in a substantially straight manner while inclined in one direction. Preferably, the angle of the fourth edge 11, in a plan view of the tread portion 2, is in a range of not less than 15 degrees with respect to the axial direction of the tire. Such a fourth edge 11 may prevent that the whole of the fourth edge 11 comes into contact with the road at the same time. Thus, the central block 3 may prevent uneven wear on the fourth edge 11 and therefore may maintain the rigidity thereof until a final stage of the use. As a result, the first inclined edge 8, which is positioned oppositely to the fourth edge 11, may also be prevented uneven wear, thereby preventing heel and toe wear (H/T wear).

In this embodiment, the length E1 of the first inclined edge 8 is the largest among the length E2 of the second inclined edge 9, the length E3 of the third edge 10 and the length E4 of the fourth edge 11. The length E1 is a straight length between the axially innermost point 6a of the central block 3 and axially outer end 8e of the first inclined edge 8. The length E2 of the second inclined edge 9 is a straight length between the axially innermost point 6a of the inner block edge 6 and axially outer end 9e of the second inclined edge 9. The length E3 of the third edge 10 is a straight length between the axially outer end 8e of the first inclined edge 8 and the axially outer end 10e of the third edge 10.

Generally, the first inclined edge 8 is acted a larger force from the road as compared with the second inclined edge 9 during traveling. Thus, the first portion 3A of the central block 3 tends to deform greater than the second portion 3B so that unbalanced deformation may occur on the central block 3 which effectively ejects clogging mud from the groove 5 between the central blocks 3 and 3.

In order to further improve the above advantageous effect, the respective edge lengths E1 to E3, and a length E4 of the fourth edge 11 may preferably be set in a certain range relative to an axial length h between the tire equator C and an axially outermost point (the outer end 10e of the third edge 10) of the central block 3. The length E1 of the first inclined edge 8, for example, is preferably in a range of from 110% to 130% of the length h. The length E2 of the second inclined edge 9, for example, is preferably in a range of from 40% to 70% of the length h. The length E3 of the third edge 10, for example, is preferably in a range of from 20% to 50% of the length h. The length E4 of the fourth edge 11, for example, is preferably in a range of from 20% to 50% of the length h.

Figure 9:
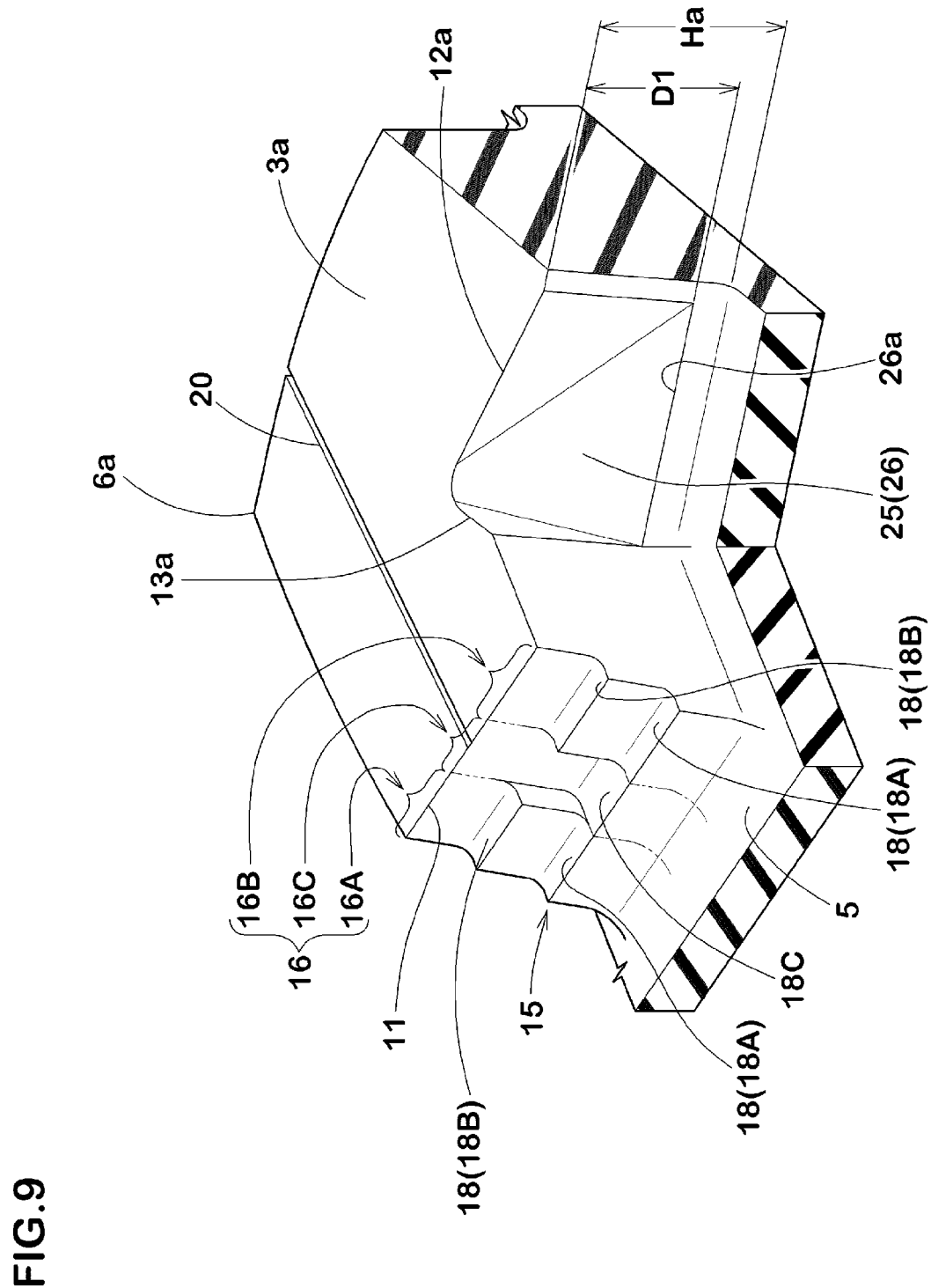
FIG. 9 is a partial perspective view of the central block of FIG. 7.
Figure 10:
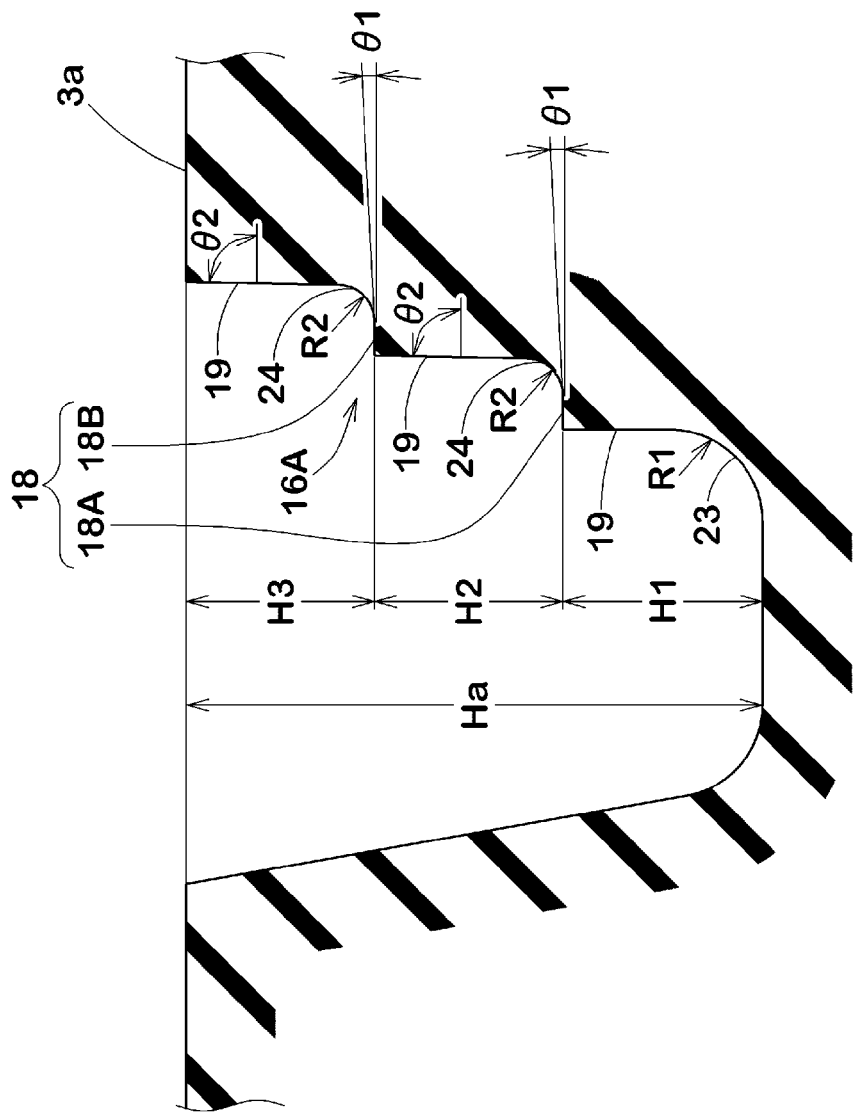
FIG. 10 is a cross-sectional view taken along lines A-A of FIG. 8.
Figure 11:
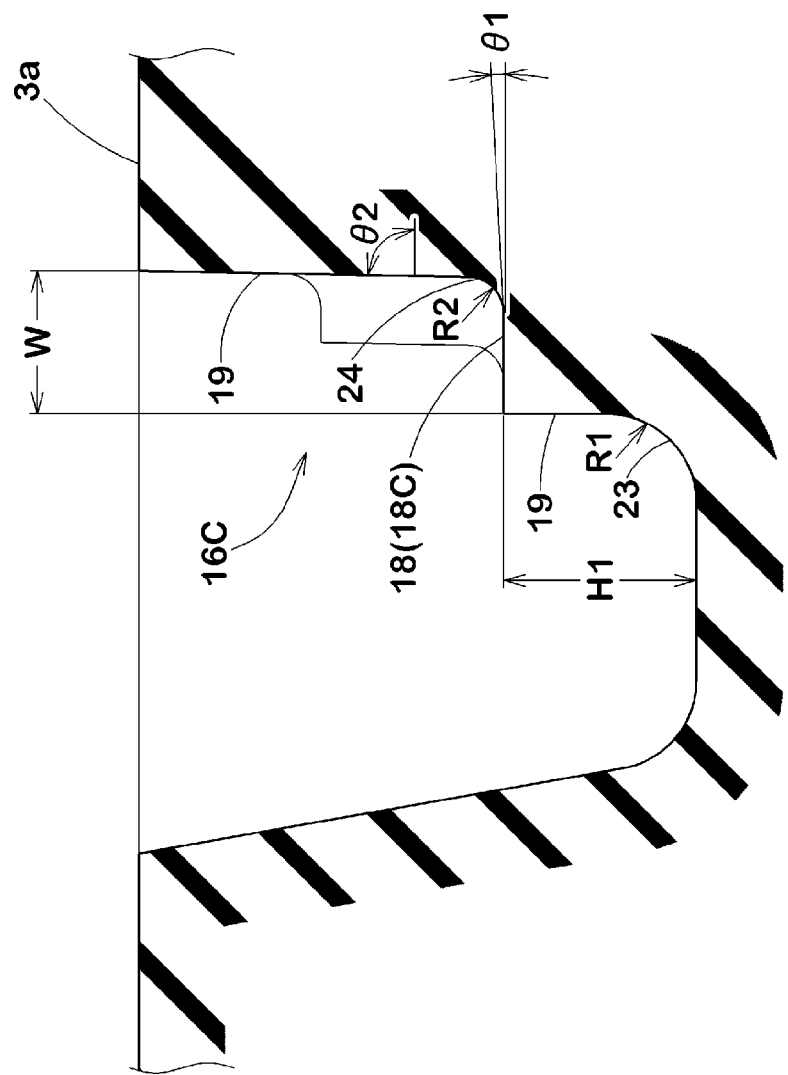
FIG. 11 is a cross-sectional view taken along lines B-B of FIG. 8.

FIG. 9 illustrates a partial perspective view of the central block 3, FIG. 10 illustrates a cross-sectional view taken along lines A-A of FIG. 8, and FIG. 11 illustrates a cross-sectional view taken along lines B-B of FIG. 8. As shown in FIG. 9, the end wall 15 in accordance with the present embodiment includes the stepwise wall 16.

The stepwise wall 16 includes the axially inner stepwise wall portion 16A arranged on the side of the tire equator C, the axially outer stepwise wall portion 16B arranged axially outwardly of the inner stepwise wall portion 16A, and a central stepwise wall portion 16C arranged between the inner and outer stepwise wall portions 16A and 16B.

As shown in FIGS. 9 and 10, each of the inner stepwise wall portions 16A and the outer stepwise wall portions 16B, in a cross-section, includes the step face 18 having an angle θ1 in a range of not more than 15 degrees with respect to the ground contacting face 3a of the central block 3, and a plurality of riser faces 19 each having an angle θ2 with respect to the ground contacting face 3a larger than the angle θ1 of the step face 18. In this embodiment, each of the inner and outer stepwise wall portions 16A and 16B includes a first step face 18A arranged on the bottom side of the groove 5 and a second step face 18B arranged radially outward of the first step face 18A to improve the self-cleaning ability to eject clogging mud in the groove while ensuring sufficient groove volume. Preferably, the height H3 from the second step face 18B to the ground contacting face 3a is in a range of from 30% to 35% of the maximum height Ha of the central block 3.

The stepwise wall 16, in a cross-section, further includes a first internal corner 23 formed between the bottom of the groove 5 and the riser face 19, and a second internal corner 24 formed between the step faces 18 and the riser face 19. Preferably, the first internal corner 23 is chamfered in an arc manner having a first radius R1 of curvature, and the second internal corner 24 is chamfered in an arc manner having a second radius R2 of curvature. Thus, stress concentration on the respective internal corners 23 and 24 may be prevented and therefore the central block rigidity may be ensured for a long time.

Preferably, the first radius R1 of curvature is greater than the second radius R2 of curvature in order to further provide for sufficient central block rigidity while ensuring self cleaning ability to eject mud from the groove.

As shown in FIG. 11, the central stepwise wall portion 16C, in a cross-section, includes the step face 18C having an angle θ1 in a range of not more than 15 degrees with respect to the ground contacting face 3a of the central block 3, and a plurality of riser faces 19 each having an angle θ2 larger than the angle θ1 of the step face 18C. In this embodiment, the central stepwise wall portion 16C includes only one step face 18C. In other words, the number of step face 18C of the central stepwise wall portion 16C is less than the number of step faces 18 of the respective inner and outer stepwise wall portion 16A and 16B, for example. This structure may help to promote traction by enhancing the central block rigidity. In this embodiment, the inner stepwise wall portion 16A has the number of step faces 18 same as that of the outer stepwise wall portion 16B, as shown in FIG. 9.

Preferably, the step face 18C of the central stepwise wall portion 16C, in a cross-section, has a horizontal length W in a range of not less than 15% of the length E2 (shown in FIG. 8) of the second inclined edge 9.

Preferably, the step face 18C of the central stepwise wall portion 16C is arranged in the same height H1 as the lowest step face, which corresponds to the first step face 18A, of each of the inner stepwise wall portion 16A and the outer stepwise wall portion 16B. In other words, as shown in FIG. 10, the step face 18C are aligned with the step faces 18A so as to form a continuous single step face portion. This structure may enhance the end wall 15 in a well balanced manner and therefore may prevent undesirable large deformation of the central block 3 when coming into contact with the road.

In this embodiment, the respective inner and outer stepwise wall portions 16A and 16B have two step faces 18. However, the present invention is not particularly limited to such an aspect, and may modify the stepwise wall 16 so as to include three or more step faces 18 to crack clogging mud in the groove effectively. In this case, the number of step faces 18 of the inner stepwise wall portion 16A may be different from the number of step faces 18 of the outer stepwise wall portion 16B.

As shown in FIG. 7, the tread portion 2 has a central region Cf which has an axial width that is equal to a width between axially outer ends (corresponding to axially outer ends 10e of the third edges 10) of the axially adjacent pair of central blocks 3. In order to further improve mud terrain performance, wet road performance and steering stability, the central region Cf has a land ratio in a range of from 50% to 60%. Here, the land ratio is define as a ratio of total area of the ground contacting faces 3a of the central blocks 3 to a gross area of the central region Cf.

While the particularly preferable embodiments of the pneumatic tire in accordance with the present invention have been described in detail, the present invention is not limited to the illustrated embodiments, but can be modified and carried out in various aspects.

Example 1

Pneumatic tires for four-wheel drive vehicles (the first embodiment type) having a basic tread pattern shown in FIG. 1 were manufactured based on the specifications of Table 1, and then mud and dirt terrain performance of each tire was tested. Major common specifications of tires and test procedures are as follows.
  Tread width TW: 240 mm
  Heights of central blocks: 17.1 mm
  Heights of shoulder blocks: 17.1 mm
Mud and Dirt Terrain Performance Test:
  Each test tire was installed to all wheels of a four-wheel drive vehicle having the displacement of 3,600 cc under the following conditions.
  Tire size: 37×12.50R17
  Rim: 9.0JJ
  Inner pressure: 100 kPa
  Then a test driver drove the vehicle on a test course in mud and dirt terrain and evaluated the traction and self-cleaning ability of the tread by his feeling. The results were indicated using a score, wherein the Ref. 1 was scored 100. The larger the score, the better the performance is.
  The test results are shown in Table 1.

FIG. 7 were manufactured based on the specifications of Table 2, and then wet road performance, mud terrain performance and uneven wear resistance of each tire was tested. Major common specifications of tires and test procedures are as follows.
  Tire size: 37×12.50R17
  Tread width TW: 240 mm
  Heights of central blocks: 15.6 mm
  Heights of shoulder blocks: 15.6 mm
  Rim size: 9.0 JJ
  Inner pressure: 100 kPa
Wet Road Performance Test:
  Each test tire was installed to all wheels of a four-wheel drive vehicle, and then a test driver drove the vehicle on a test course of wet asphalt road and evaluated the steering stability by his feeling. The results were indicated using a score, wherein the Ref. was scored 100. The larger the score, the better the performance is. Mud terrain performance test:
  Each test tire was installed to all wheels of a four-wheel drive vehicle, and then a test driver drove the vehicle on a test course in mud terrain. Then the driver evaluated the traction and self-cleaning ability of the tread by his feeling. The results were indicated using a score, wherein the Ref. 1 was scored 100. The larger the score, the better the performance is.
Uneven Wear Resistance Test:
  Each test tire was installed to a drum tester and made to run. Then an amount of H/T wear of central blocks was

TABLE 1

Figure 12:
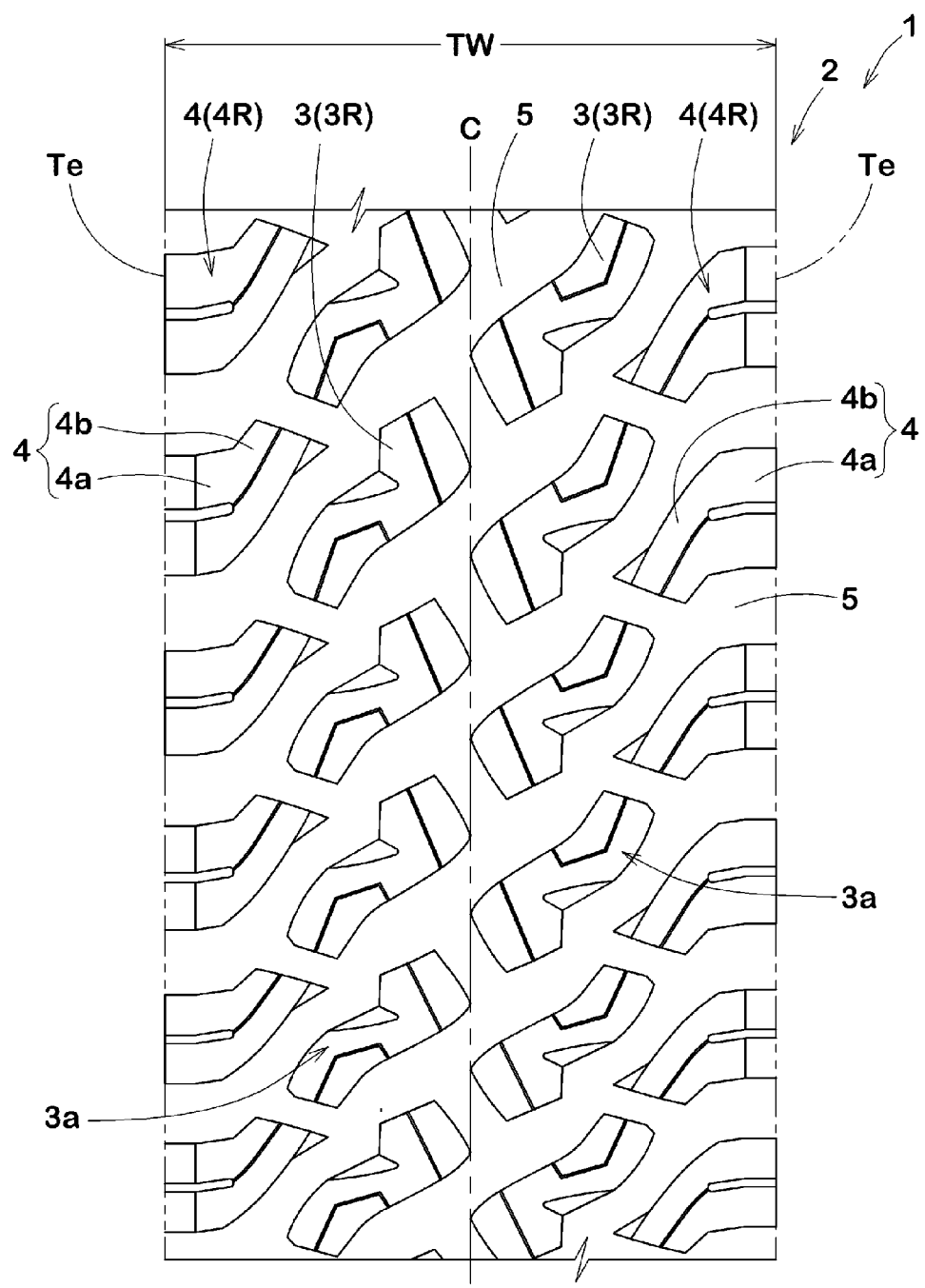
FIG. 12 is a development view of a tread portion of a reference pneumatic tire.

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Tread pattern | FIG. 12 | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Ratio L2/L1 | 0.5 | 1 | 0.5 | 0.3 | 0.4 | 0.6 | 0.7 | 0.5 | 0.5 | 0.5 | 0.5 | 0.5 |
| Ratio L5/Ha (%) | — | 20 | 20 | 20 | 20 | 20 | 20 | 5 | 10 | 30 | 40 | 20 |
| Ratio La/TW (%) | 10 | 10 | 10 | 10 | 10 | 10 | 10 | 10 | 10 | 10 | 10 | 3 |
| Ratio B/(A + B) (%) | 55 | 55 | 55 | 55 | 55 | 55 | 55 | 55 | 55 | 55 | 55 | 55 |
| Ratio L6/Wa (%) | 20 | 20 | 20 | 20 | 20 | 20 | 20 | 20 | 20 | 20 | 20 | 20 |
| Mud performance [Score] | 100 | 102 | 110 | 106 | 108 | 109 | 106 | 107 | 109 | 108 | 107 | 106 |
| Dirt performance [Score] | 100 | 102 | 110 | 107 | 109 | 108 | 107 | 106 | 108 | 109 | 106 | 106 |

|  | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 6 |
| Ratio L2/L1 | 0.5 | 0.5 | 0.5 | 0.5 | 0.5 | 0.5 | 0.5 | 0.5 | 0.5 | 0.5 | 0.5 | 0.5 |
| Ratio L5/Ha (%) | 20 | 20 | 20 | 20 | 20 | 20 | 20 | 20 | 20 | 20 | 20 | *1 |
| Ratio La/TW (%) | 5 | 20 | 25 | 10 | 10 | 10 | 10 | 10 | 10 | 10 | 10 | 10 |
| Ratio B/(A + B) (%) | 55 | 55 | 55 | 40 | 45 | 70 | 75 | 55 | 55 | 55 | 55 | 55 |
| Ratio L6/Wa (%) | 20 | 20 | 20 | 20 | 20 | 20 | 20 | 5 | 10 | 30 | 35 | 20 |
| Mud performance [Score] | 108 | 109 | 106 | 107 | 109 | 108 | 107 | 107 | 109 | 108 | 107 | 109 |
| Dirt performance [Score] | 109 | 108 | 107 | 106 | 108 | 109 | 106 | 106 | 108 | 109 | 106 | 111 |

* Horizontal length of each step face of outer stepwise wall portion is 20% relative to second inclined edge length.
* Horizontal length of each step face of inner stepwise wall portion is 13% relative to second inclined edge length.

From the test results, it was confirmed that the example tires had excellent mud and dirt terrain performance as compared with the reference tires. In another test where tires having a different tire size described above were used, a similar tendency of the results of this test was confirmed.

Example 2

Pneumatic tires for four-wheel drive vehicles (the third embodiment type) having a basic tread pattern shown in measured. The results were indicated using a score of five grades, wherein the Ref. was scored 3. The larger the score, the better the performance is. The test results are shown in Table 2.

From the test results, it was confirmed that the example tires had excellent wet road performance and mud terrain performance as compared with the reference tires. Furthermore, it was also confirmed that the example tires had excellent uneven wear resistance as compared with the reference tires.

TABLE 2

|  | Ref. | Ex. 1 | Ex. 2 | Ex. 3 | Ex. 4 | Ex. 5 |
| --- | --- | --- | --- | --- | --- | --- |
| Stepwise wall | Absence | Presence | Presence | Presence | Presence | Presence |
| Angle θ1 (deg.) | — | 15 | 30 | 15 | 15 | 15 |
| Ratio H1:H2:H3 (%) (See FIG. 10) | — | 40:30:30 | 40:30:30 | 40:30:30 | 20:40:40 | 40:30:30 |
| Ratio W/E2 (%) | — | 15 | 15 | 15 | 15 | 5 |
| Ratio E4/h (%) | 27 | 27 | 27 | 10 | 27 | 27 |
| Land ratio of central region (%) | 55 | 55 | 55 | 50 | 55 | 55 |
| Wet performance [Index] | 100 | 110 | 105 | 110 | 110 | 115 |
| Mud performance [Index] | 100 | 130 | 110 | 105 | 110 | 105 |
| Uneven wear resistance [Score] | 3 | 5 | 5 | 4 | 3.5 | 3.5 |

What is claimed is:

1. A pneumatic tire comprising
a tread portion provided with a pair of central blocks arranged on both sides of a tire equator, each of the central blocks comprising a ground contacting face having an axially inner block edge facing the tire equator,
the inner block edge extending in a V-shaped manner comprising an axially innermost point, a first inclined edge extending from the innermost point, and a second inclined edge extending from the innermost point and inclined in an opposite direction to the first inclined edge, wherein the second inclined edge has a circumferential length shorter than a circumferential length of the first inclined edge, and
each of the central blocks comprising a first portion having the first inclined edge and a second portion having the second inclined edge, the second portion of each of the central blocks comprising an end wall at an opposite side to the first portion, wherein the end wall comprises a stepwise wall that extends in steps toward a groove bottom,
wherein
the stepwise wall comprises an axially inner stepwise wall portion and an axially outer stepwise wall portion,
each of the inner stepwise wall portion and the outer stepwise wall portion comprises a plurality of the step faces each having an angle in a range of not more than 15 degrees with respect to the ground contacting face of the central block, and
a number of step faces of the inner stepwise wall portion is greater than a number of step faces of the outer stepwise wall portion.

2. The pneumatic tire according to claim 1, wherein the end wall further comprises a slope face provided between the inner stepwise wall portion and the outer stepwise wall portion.

3. The pneumatic tire according to claim 1, wherein each of the central blocks is provided with at least one sipe extending in a longitudinal direction of the second portion.

4. The pneumatic tire according to claim 1, wherein the pair of central blocks are axially adjacent with each other and arranged so that each of the first inclined edges faces one another.

5. The pneumatic tire according to claim 1, wherein each of the ground contacting faces of the central blocks comprises a fourth inclined edge extending along the end wall, and the fourth edge is inclined in the same direction as the first inclined edge.

6. The pneumatic tire according to claim 5, wherein the fourth inclined edge, in a plan view of the tread portion, has an angle of not less than 15 degrees with respect to an axial direction of the tire.

7. The pneumatic tire according to claim 5, wherein the fourth inclined edge has a length in a range of from 20% to 50% of an axial length between the tire equator and an axially outermost point of the central block.

8. The pneumatic tire according to claim 1, wherein the stepwise wall, in a cross-section, further comprises a plurality of riser faces each having an angle, with respect to the ground contacting face, being larger than that of an angle of the step faces with respect to the ground contact face.

9. The pneumatic tire according to claim 8, wherein
the stepwise wall, in a cross-section, further comprises a first internal corner formed between the groove bottom and one of the riser faces, and a second internal corner formed between one of the step faces and the other one of the riser faces,
the first internal corner is chamfered in an arc manner having a first radius of curvature, the second internal corner is chamfered in an arc manner having a second radius of curvature, and
the first radius of curvature is greater than the second radius of curvature.

10. The pneumatic tire according to claim 1, wherein the stepwise wall comprises a central stepwise wall portion provided between the inner stepwise wall portion and the outer stepwise wall portion, and wherein the central stepwise wall portion has only one step face.

11. The pneumatic tire according to claim 10, wherein each of the inner stepwise wall portion and the outer stepwise wall portion comprises a lowest step face arranged in the same height of the step face of the central stepwise wall portion.

12. The pneumatic tire according to claim 10, wherein the step face of the central stepwise wall portion, in a cross-section, has a horizontal length in a range of not less than 15% of a length of the second inclined edge.

13. The pneumatic tire according to claim 10, wherein
each of the inner stepwise wall portion and the outer stepwise wall portion comprises a first step face and a second step face,
the first step face has a height from the groove bottom in a range of from 30% to 38% of a maximum central block height, and
the second step face has a height from the groove bottom in a range of from 64% to 72% of the maximum central block height.

14. The pneumatic tire according to claim 1, wherein the tread portion has a central region having an axial width that is equal to a width between axially outer ends of the pair of central blocks, and the central region has a land ratio in a range of from 50% to 60%.

15. A pneumatic tire comprising
a tread portion provided with a pair of central blocks arranged on both sides of a tire equator, each of the central blocks comprising a ground contacting face having an axially inner block edge facing the tire equator, the inner block edge extending in a V-shaped manner comprising an axially innermost point, a first inclined edge extending from the innermost point, and a second inclined edge extending from the innermost point and inclined in an opposite direction to the first inclined edge, wherein the second inclined edge has a circumferential length shorter than a circumferential length of the first inclined edge, and each of the central blocks comprising a first portion having the first inclined edge and a second portion having the second inclined edge, the second portion of each of the central blocks comprising an end wall at an opposite side to the first portion, wherein the end wall comprises a stepwise wall that extends in steps toward a groove bottom, wherein the stepwise wall, in a cross-section, comprises a step face having an angle in a range of not more than 15 degrees with respect to the ground contacting face of the central block, a plurality of riser faces each having an angle with respect to the ground contact face being larger than that of an angle of the step faces with respect to the ground contact face, a first internal corner formed between the groove bottom and one of the riser faces, and a second internal corner formed between the step face and the other one of the riser faces, the first internal corner is chamfered in an arc manner having a first radius of curvature, the second internal corner is chamfered in an arc manner having a second radius of curvature, and the first radius of curvature is greater than the second radius of curvature.

16. A pneumatic tire comprising a tread portion provided with a pair of central blocks arranged on both sides of a tire equator, each of the central blocks comprising a ground contacting face having an axially inner block edge facing the tire equator, the inner block edge extending in a V-shaped manner comprising an axially innermost point, a first inclined edge extending from the innermost point, and a second inclined edge extending from the innermost point and inclined in an opposite direction to the first inclined edge, wherein the second inclined edge has a circumferential length shorter than a circumferential length of the first inclined edge, and each of the central blocks comprising a first portion having the first inclined edge and a second portion having the second inclined edge, the second portion of each of the central blocks comprising an end wall at an opposite side to the first portion, wherein the end wall comprises a stepwise wall that extends in steps toward a groove bottom, wherein the stepwise wall comprises an axially inner stepwise wall portion, an axially outer stepwise wall portion, and a central stepwise wall portion provided between the inner stepwise wall portion and the outer stepwise wall portion, each of the inner stepwise wall portion and the outer stepwise wall portion comprises a plurality of step faces each having an angle in a range of not more than 15 degrees with respect to the ground contacting face of the central block, the central stepwise wall portion has only one step face having an angle in a range of not more than 15 degrees with respect to the ground contacting face of the central block, each of the inner stepwise wall portion and the outer stepwise wall portion comprises a first step face and a second step face, the first step face has a height from the groove bottom in a range of from 30% to 38% of a maximum central block height, and the second step face has a height from the groove bottom in a range of from 64% to 72% of the maximum central block height.

17. A pneumatic tire comprising a tread portion provided with a pair of central blocks arranged on both sides of a tire equator, each of the central blocks comprising a ground contacting face having an axially inner block edge facing the tire equator, the inner block edge extending in a V-shaped manner comprising an axially innermost point, a first inclined edge extending from the innermost point, and a second inclined edge extending from the innermost point and inclined in an opposite direction to the first inclined edge, wherein the second inclined edge has a circumferential length shorter than a circumferential length of the first inclined edge, and each of the central blocks comprising a first portion having the first inclined edge and a second portion having the second inclined edge, the second portion of each of the central blocks comprising an end wall at an opposite side to the first portion, wherein the end wall comprises a stepwise wall that extends in steps toward a groove bottom, wherein the stepwise wall comprises an axially inner stepwise wall portion, an axially outer stepwise wall portion, and a central stepwise wall portion provided between the inner stepwise wall portion and the outer stepwise wall portion, each of the inner stepwise wall portion and the outer stepwise wall portion comprises a plurality of step faces each having an angle in a range of not more than 15 degrees with respect to the ground contacting face of the central block, and the central stepwise wall portion has at least one step face, wherein a number of the at least one step face of the central stepwise portion is less than a number of the step faces of the inner stepwise wall portion and a number of the step faces of the outer stepwise wall portion.

* * * * *